US009366823B1

(12) United States Patent  
McCauley

(10) Patent No.: US 9,366,823 B1  
(45) Date of Patent: Jun. 14, 2016

(54) NON-LINEAR ANALOG MAPPER FOR MEMS BASED OPTICAL CIRCUIT SWITCHES

(71) Applicant: Google Inc., Mountain View, CA (US)

(72) Inventor: Scott Donald McCauley, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 84 days.

(21) Appl. No.: 14/274,491

(22) Filed: May 9, 2014

(51) Int. Cl.  
*G02B 6/35* (2006.01)  
*G01C 19/5712* (2012.01)

(52) U.S. Cl.  
CPC .......... *G02B 6/3518* (2013.01); *G01C 19/5712* (2013.01)

(58) Field of Classification Search  
None  
See application file for complete search history.

(56) References Cited

U.S. PATENT DOCUMENTS

| 6,329,974 | B1 * | 12/2001 | Walker et al. | 345/98 |
| 6,744,034 | B2 * | 6/2004 | Heminger | G02B 26/02 250/205 |
| 7,099,597 | B2 | 8/2006 | Saunders et al. | |
| 7,155,125 | B2 * | 12/2006 | Mori | 398/45 |
| 7,961,993 | B2 * | 6/2011 | Shimizu et al. | 385/18 |
| 2004/0141682 | A1 * | 7/2004 | Mori | G02B 6/3586 385/18 |
| 2006/0103910 | A1 * | 5/2006 | Huang et al. | 359/237 |
| 2009/0207159 | A1 * | 8/2009 | Govil | 345/211 |
| 2009/0244674 | A1 * | 10/2009 | Ishii et al. | 359/221.2 |
| 2009/0245727 | A1 * | 10/2009 | Shimizu | G02B 6/359 385/18 |
| 2010/0148293 | A1 * | 6/2010 | Jain et al. | 257/434 |
| 2011/0311080 | A1 * | 12/2011 | Jaar et al. | 381/174 |
| 2012/0076502 | A1 | 3/2012 | Swanson et al. | |
| 2015/0185011 | A1 * | 7/2015 | Beaulaton et al. | 73/504.12 |
| 2015/0253511 | A1 * | 9/2015 | Pelley | G02B 6/3584 385/14 |

FOREIGN PATENT DOCUMENTS

GB 2 424 134 A 9/2006

* cited by examiner

*Primary Examiner* — Tina Wong  
(74) *Attorney, Agent, or Firm* — Edward A. Gordon; Foley & Lardner LLP

(57) ABSTRACT

This disclosure provides systems, methods, and apparatus for a MEMS mirrors based optical circuit switch. The optical circuit switch includes digital to analog converter (DAC) for converting digital position codes into analog mirror position signals. A mapper transforms the analog mirror position signal into a mapped mirror position signal. The mapped mirror position signal is provided to a MEMS actuator that positions the MEMS mirror based on the mapped mirror position signal. The mapper transforms the analog mirror position signal into the mapped mirror position signal such that the MEMS mirror position has a substantially linear relationship with the analog mirror position signal provided by the DAC.

8 Claims, 8 Drawing Sheets

$$v_m = V_{th} - \sqrt{\frac{v_p}{R_1 \cdot g_m}}$$

NON-LINEAR ANALOG MAPPER FOR MEMS BASED OPTICAL CIRCUIT SWITCHES

TECHNICAL FIELD

This disclosure relates to the field of communication networks, and in particular to communication switches.

DESCRIPTION OF THE RELATED TECHNOLOGY

Some optical switches can utilize MEMS mirrors for selectively switching optical signals between input optical fibers and output optical fibers. The selective switching can be achieved by positioning the MEMS mirrors in a manner such that input optical signals received from an input optical fiber are reflected to the desired output optical fibers. MEMS mirror positioning systems typically use digital control systems, where the digital control system generates a digital position signal indicating the desired position of the MEMS mirror. Typically, the digital position signal is converted into an analog position signal by a digital-to-analog converter (DAC) and the analog position signal is fed to a MEMS mirror actuator. The MEMS mirror actuator positions the MEMS mirror in response to the magnitude of the received analog position signal.

SUMMARY

According to one aspect, the subject matter described in this disclosure relates to a micro-electromechanical systems (MEMS) based optical switch including a plurality of optical input ports providing incoming optical signals, a plurality of optical output ports providing outgoing optical signals, a plurality of MEMS light redirectors (LRs) configured to selectively redirect the incoming optical signals to the plurality of optical output ports, a MEMS actuator configured to provide a MEMS LR position to at least one of the plurality of MEMS LRs in response to a drive signal, the MEMS actuator having a non-linear drive signal to MEMS LR position transfer function, and a driver circuit communicably coupled to the MEMS actuator. The driver circuit includes a digital-to-analog converter (DAC) configured to generate an analog MEMS position signal in response to a digital MEMS position value, and a non-linearity compensation circuit having an input coupled to an output of the DAC to receive the analog MEMS position signal, and an output coupled to the MEMS actuator for providing the drive signal to the MEMS actuator, the non-linearity compensation circuit configured to have a transfer function to that substantially counters the non-linearity of the drive signal to MEMS LR position transfer function such that the MEMS actuator exhibits a substantially linear response to the output of the DAC.

According to another aspect, the subject matter described in this disclosure relates to a method for a method for positioning a micro-electromechanical systems (MEMS) light redirector (LR) in an optical communication switch. The method includes obtaining a digital MEMS LR position value, converting the digital MEMS LR position value into an analog MEMS LR position signal, transforming the analog MEMS LR position signal into a drive signal such that a MEMS LR position has a linear relationship with the analog MEMS LR position signal, and providing the drive signal to a MEMS LR actuator for positioning the MEMS LR based on the magnitude of the drive signal, where the MEMS mirror actuator has a non-linear drive signal to MEMS LR position transfer function.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1:
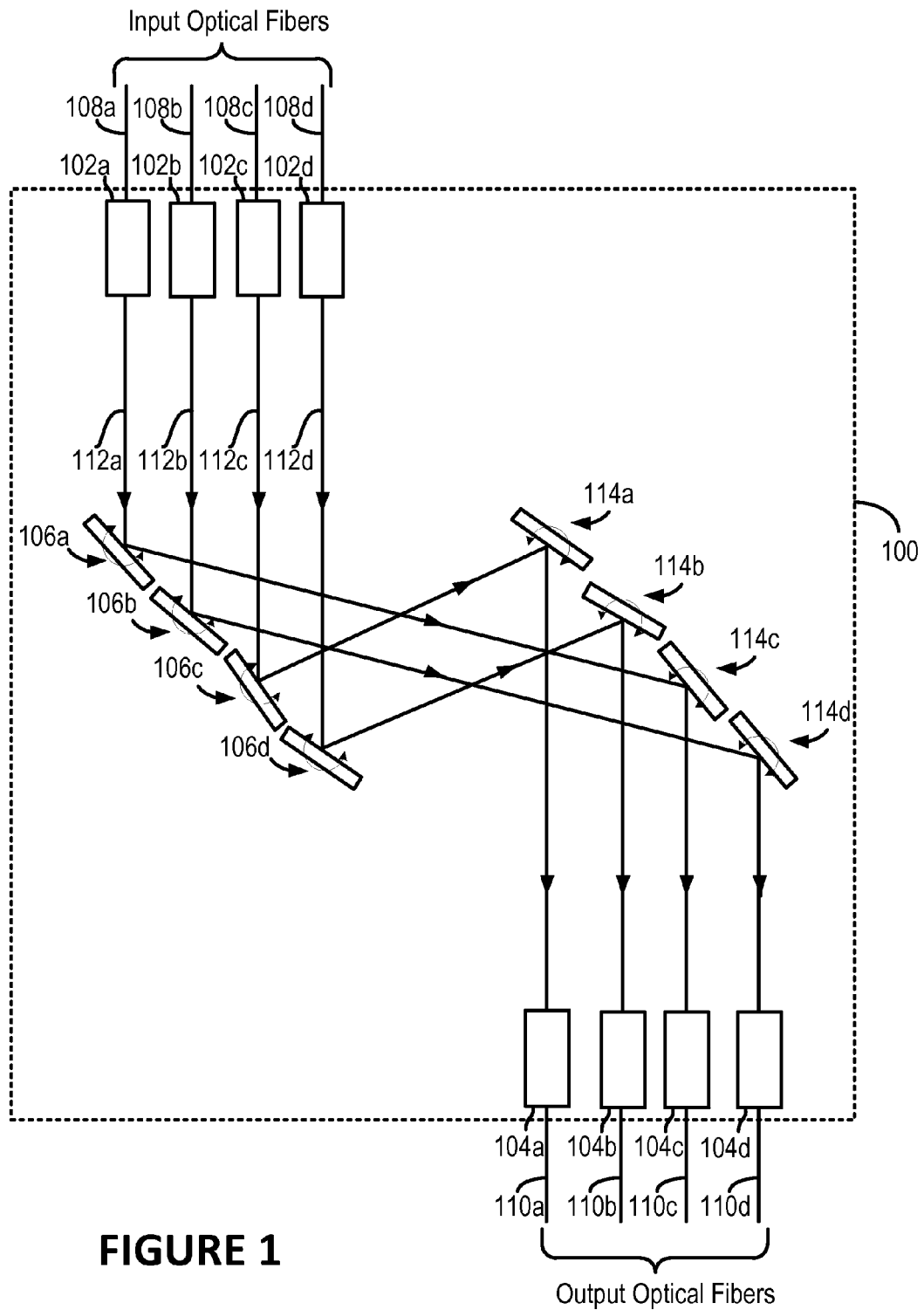
FIG. 1 shows a block diagram of an example micro-electromechanical systems (MEMS) crosspoint switch.

FIG. 1 shows a block diagram of an example microelectromechanical systems (MEMS) optical switch 100. In particular, the MEMS optical switch 100 includes four input ports: a first input port 102a, a second input port 102b, a third input port 102c and a fourth input port 102d; four output ports: a first output port 104a, a second output port 104b, a third output port 104c, and a fourth output port 104d; four input MEMS mirrors: a first input MEMS mirror 106a, a second input MEMS mirror 106b, a third input MEMS mirror 106c, and a fourth input MEMS mirror 106d; and four output MEMS mirrors: a first output MEMS mirror 112a, a second output MEMS mirror 112b, a third output MEMS mirror 112c, and a fourth output MEMS mirror 112d. The four input ports 104a-104d can be coupled to four input optical fibers 108a-108d, respectively. Similarly, the four output ports 106a-106d can be coupled to four output optical fibers 110a-110d. As discussed below, the MEMS optical switch 100 can selectively switch optical signals received on any one of its four input optical fibers 108a-108d to any one of the four output optical fibers 110a-110d using the four input MEMS mirrors 106a-106d and the four output MEMS mirrors 112a-112d.

Each of the four input ports 102a-102d can include focusing elements, collimating elements, and other optical elements that can receive optical signals from their respective input optical fibers 108a-108d, and focus the optical signals onto the four input MEMS mirrors 106a-106d. Each of the four output ports 104a-104d can also include focusing elements, collimating elements, and other optical elements that can receive optical signals reflected by the four output MEMS mirrors 114a-114d and transmit the received optical signals over their respective output optical fibers 110a-110d.

Each of the four input MEMS mirrors 106a-106d can be tilted about an axis in a manner such that incident optical signals from a corresponding one of the four input ports 102a-102d can be reflected onto any one of the four output MEMS mirrors 114a-114d. Similarly, each of the four output MEMS mirrors 114a-114d can be tilted about an axis in a manner such that incident optical signals from any one of the four input MEMS mirrors 106a-106d can be reflected to a corresponding one of the four output ports 104a-104d. For example, the first input MEMS mirror 106a can be tilted into at least four different positions such that an optical signal 112a, which is emitted from the first input port 102a and incident on the surface of the first input MEMS mirror 106a, can be selectively reflected onto any one of the four output MEMS mirrors 114a-114d. Similarly, each of the other three input MEMS mirrors 106b-106d can be also tilted in at least four different positions such that the corresponding one of the four optical signals 112b-112d can be selectively reflected onto any one of the four output MEMS mirrors 114a-114d. Further, each of the four output MEMS mirrors 114a-114d can be tilted in at least four different positions such that the any one of the incident optical signals 112a-112d, reflected by the first input MEMS mirrors 106a-106d, can again be selectively reflected onto the corresponding one of the four output ports 104a-104d.

In the example shown in FIG. 1, the first input MEMS mirror 106a is positioned such that the optical signal 112a is reflected to the third output MEMS mirror 114c, which, in turn, is positioned such that the optical signal 112a is reflected onto the third output port 104c; the second input MEMS mirror 106b is positioned such that the optical signal 112b is reflected to the fourth output MEMS mirror 114d, which, in turn, is positioned such that the optical signal 112b is reflected onto the fourth output port 104d; the third input MEMS mirror 106c is positioned such that the optical signal 112c is reflected to the first output MEMS mirror 114a, which, in turn, is positioned such that the optical signal 112c is reflected onto the first output port 104a; and the fourth input MEMS mirror 106a is positioned such that the optical signal 112d is reflected to the second output MEMS mirror 114b, which, in turn, is positioned such that the optical signal 112d is reflected onto the second output port 104b. It is understood that other positions of the four input MEMS mirrors 106a-106d and the four output MEMS mirrors 114a-114d can result in other configurations. In general, the positions of the four input MEMS mirrors 106a-106d and the four output MEMS mirrors 114a-114d can be selected based on switching instructions received by the switch 100.

The MEMS optical switch 100 can provide bi-directional switching. That is, optical signals received from the four output ports 104a-104d also can be selectively switched to any one of the four input ports 102a-102d.

In some implementations, other optical switches can be employed for switching optical signals between input optical fibers 108a-108d and output optical fibers 110a-110d. For example, in some implementations, three-dimensional (3-D) optical switches can be used in which optical signals received from the input fibers 108a-108d are reflected by two (or more) sets of MEMS mirrors before being sent out via desired output optical fibers 110a-110d. The 3-D switch configuration is different from the optical switch 100 shown in FIG. 1, in which the optical signals are reflected by the MEMS mirrors 106a-106d within a single plane (i.e., two dimensions). In some implementations, the MEMS mirrors used in such 3-D optical switches may tilt about two axes. In some implementations, the MEMS mirrors 106a-106d can be placed in more than one plane. In some implementations, the input ports 102a-102d and/or the output ports 104a-104d can be placed in more than one plane.

While FIG. 1 shows the optical switch 100 utilizing input MEMS mirrors 106a-106d and output MEMS mirrors 114a-114d for redirecting light signals 112a-112d, respectively, to the output ports 104a-104d, any light redirecting device that is capable of selectively redirecting light to the output ports can be utilized in place of the MEMS mirror. For example, in some implementations, the light redirectors can include diffraction gratings, programmable piezoelectric actuators, semiconductor optical amplifiers, interferometers, etc.

Figure 2:
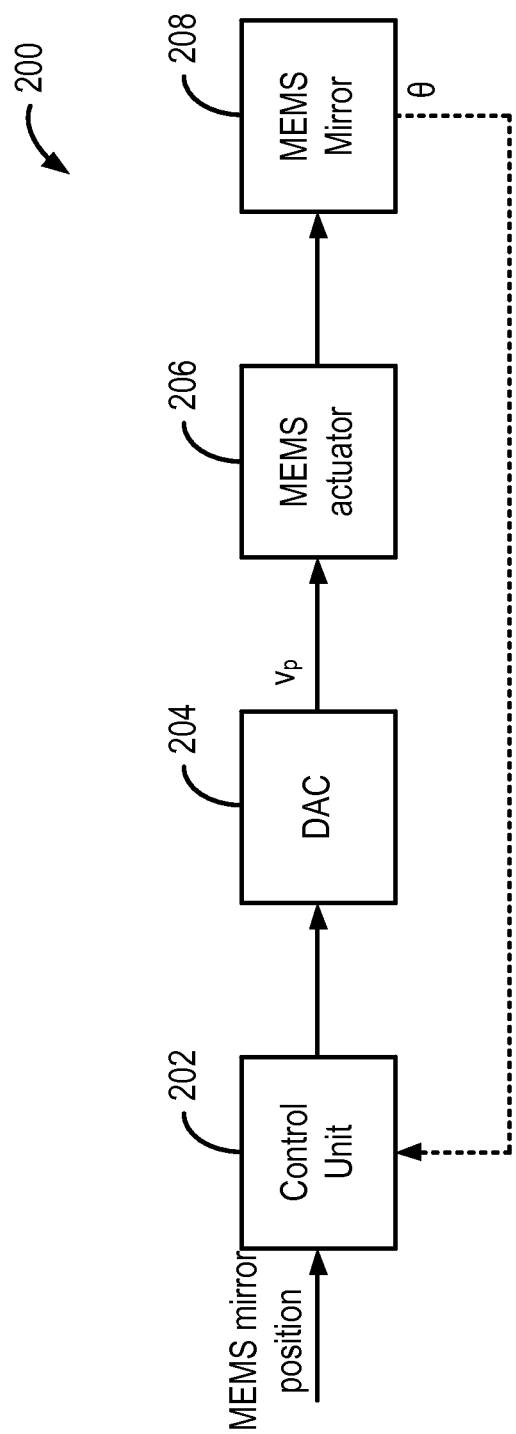
FIG. 2 shows a block diagram of an example MEMS mirror position control system.

FIG. 2 shows a block diagram of a MEMS mirror position control system 200. In particular, the MEMS mirror position control system 200 ("the position control system 200") can be utilized for controlling the positions of one or more MEMS mirrors used in optical switches. For example, the position control system 200 can be utilized for controlling the position of one of the four MEMS mirrors 106a-106d of the optical switch 100 shown in FIG. 1.

The position control system 200 can include a control unit 202, a digital-to-analog converter (DAC) 204, a MEMS actuator 206, and a MEMS mirror 208. The control unit 202 can receive MEMS position data, and based on the MEMS position data generate a digital position code that corresponds to the desired position of the MEMS mirror 208. The DAC 204 can convert the digital position code into an analog position voltage. The analog position voltage can be received by the MEMS actuator 206, which actuates the MEMS mirror 208 based on the magnitude of the analog position voltage.

In some implementations, the position data received by the control unit 202 may be received from a switch controller controlling the operation of the optical switch. For example, the position data may include the port number to which a light incident on the MEMS mirror 208 is to be directed. Based on the port number, the control unit 202 can determine the tilt position of the MEMS mirror 208, and generate a digital position code based on the desired tilt position. In some implementations, the control unit 202 may receive a feedback signal indicating the current position of the MEMS mirror 208. The control unit 202 can compare the current position of the MEMS mirror 208 to the desired position, and generate the appropriate digital position code. In some implementations, the position control system 200 can be operated without the position feedback in an open-loop control mode.

The DAC 204 can receive the digital position code from the control unit 202 and convert the digital position code into an analog position voltage $v_p$, which is provided to the MEMS actuator 206. In some implementations, the DAC 204 can have a substantially linear digital to analog transfer function. That is, the DAC 204 can have a linear relationship between the magnitude of the position voltage indicated by the digital position code and the analog position voltage $v_p$ generated by the DAC 204. In some implementations, the DAC 204 can be implemented using various architectures such as, but not limited to, sigma-delta DACs, binary weighted DACs, resistor ladder DACs, successive approximation DACs, etc.

In some implementations, the analog position voltage $v_p$ can undergo signal conditioning before being fed to the MEMS actuator 206. In some implementations, the signal conditioning can include low-pass filtering to smoothen the analog position voltage $v_p$. In some implementations, signal conditioning can also include level-shifting, peak-limiting, amplification, etc.

The MEMS actuator 206 can receive the analog position voltage $v_p$ generated by the DAC 204 as a drive signal. The MEMS actuator 206 can position the MEMS mirror 208 based on the magnitude of the analog position voltage $v_p$. The MEMS actuator 206 can include electrostatic actuators, magnetic actuators, piezoelectric actuators, etc. In some instances, such as where the MEMS actuator 206 is magnetic actuator, the analog position voltage $v_p$ may have to be converted into a corresponding analog position current $i_p$, which can be provided as the drive signal to the magnetic MEMS actuator 206. The MEMS actuator 206 may produce rotational, torsional, transverse, or any form of motion in the MEMS mirror 208 based on the magnitude of the analog position voltage $v_p$. For example, if the MEMS actuator 206 were to be utilized to actuate one of the input MEMS mirrors 106a-106d shown in FIG. 1, then the MEMS actuator 206 could provide a tilting motion (or rotational motion about an axis) to one of the MEMS mirrors 106a-106d based on the magnitude of the analog position voltage $v_p$. In some implementations, the position of the MEMS mirror 208 in response to the analog position voltage $v_p$ can be described by a transfer function of the MEMS actuator 206.

Figure 3:
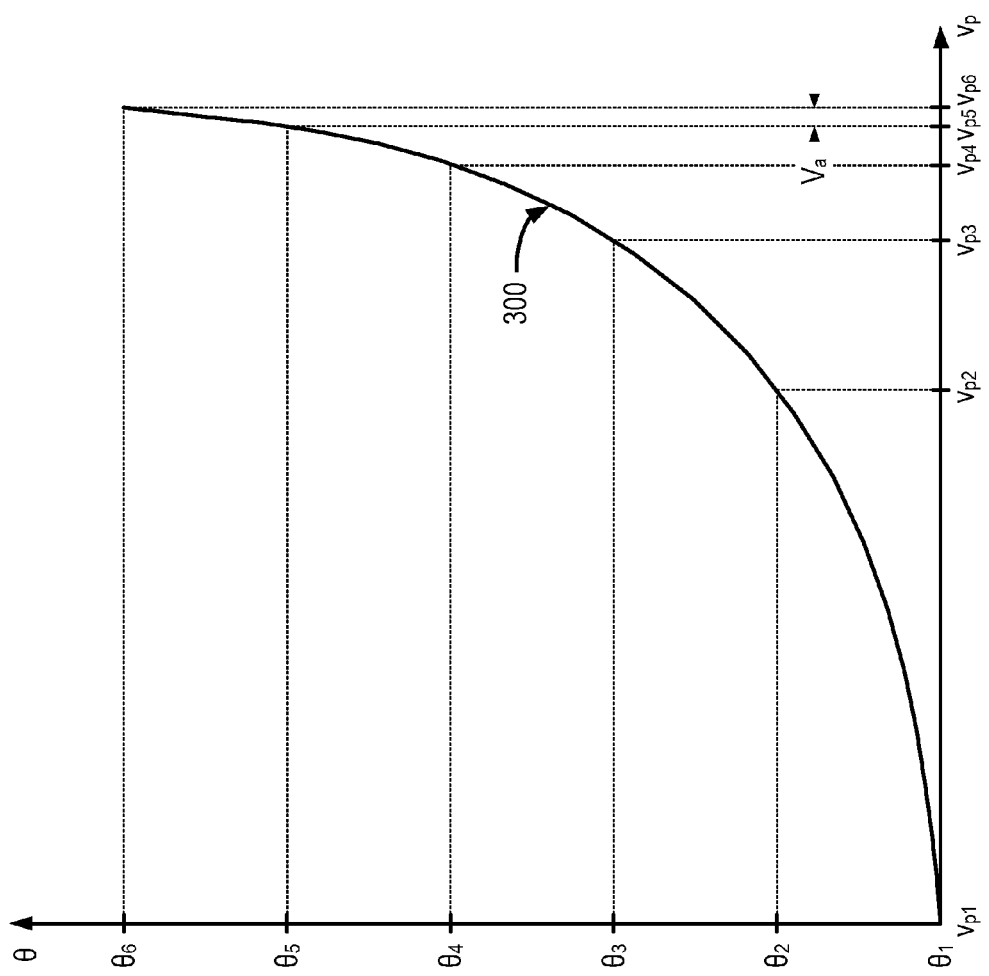
FIG. 3 shows a transfer function curve of an example MEMS actuator of the position control system shown in FIG. 2.

FIG. 3 shows a transfer function curve 300 of the MEMS actuator 206 of the position control system 200 shown in FIG. 2. In particular, FIG. 3 shows the relationship between an actuation voltage provided to the MEMS actuator 206 and the corresponding position of the MEMS mirror 208. The transfer function curve 300 is shown in an x-y coordinate plane, where the magnitude of the analog position voltage $v_p$, which is provided as the drive signal, is represented on the x-axis and the position $\theta$ of the MEMS mirror 208 is represented on the y-axis. While the transfer function curve 300 shown in FIG. 3 denotes the position of the MEMS mirror 208 in terms of an angle $\theta$, it is understood that based on the design of the MEMS mirror 208 the position can be expressed in other appropriate units of measurement as well.

The transfer function of the MEMS actuator 206 can describe a relationship between a drive signal provided to the MEMS actuator 206 and a resulting MEMS mirror 208 position as a result of the magnitude of the drive signal. In the example shown in FIG. 3, the transfer function curve 300 is non-linear. In particular, the transfer function curve 300 is substantially quadratic. That is, the MEMS mirror 208 position $\theta$ is a function of the square of the analog position voltage $v_p$. Different MEMS actuators can have different transfer functions. For example, some MEMS actuators may exhibit an exponential transfer function, while other MEMS actuators may exhibit "log" transfer functions. In some implementations, the MEMS actuators may exhibit a transfer function having a complex non-linear relationship between the MEMS mirror position $\theta$ and the position voltage $v_p$.

FIG. 3 shows the analog position voltages $v_{p1}$, $v_{p2}$, $v_{p3}$, $v_{p4}$, $v_{p5}$, and $v_{p6}$, needed by the MEMS actuator 206 to position the MEMS mirror 208 into positions indicated by $\theta_1$, $\theta_2$, $\theta_3$, $\theta_4$, $\theta_5$, and $\theta_6$, respectively. The MEMS positions $\theta_1$-$\theta_6$ can represent a set of angles in which the MEMS mirror 208 needs to be positioned for a desired operation of the optical switch. The number of positions is not limited to the 6 positions $\theta_1$-$\theta_6$, shown in FIG. 3, and can be based, in part, on the design of the optical switch. For example, referring to the optical switch 100 shown in FIG. 1, the MEMS mirror 106a may need to be positioned in at least 4 positions to be able to selectively reflect incident light 112a to any of the four output ports 104a-104d. In some implementations, the MEMS actuator 206 can position the MEMS mirror 208 at any position theta if the corresponding analog position voltage $v_p$, in accordance with the transfer function curve 300, is provided to the MEMS actuator 206. In some implementations, the MEMS positions $\theta_1$-$\theta_6$ may be unequally distributed.

The MEMS mirror 208 can be moved into the desired position $\theta_1$-$\theta_6$ by providing the MEMS actuator 206 with the corresponding analog position voltage $v_{p1}$-$v_{p6}$. For example, for positioning the MEMS mirror 208 at an angle $\theta_3$, the MEMS actuator 206 can be provided with the analog position voltage $v_{p3}$. Due to the non-linear nature of the transfer function curve 300, a change in the analog actuation voltages needed to tilt the MEMS mirror 208 by a certain amount near one end of the transfer function curve 300 can be different from that needed to tilt the MEMS mirror 208 by the substantially same amount near the other end of the transfer function curve 300. For example, to move the MEMS mirror 208 from position $\theta_1$ to $\theta_2$, the analog position voltage can be changed from $v_{p1}$ to $v_{p2}$. But, to move the MEMS mirror 208 from position $\theta_5$ to $\theta_6$ (which has a change in tilt that is substantially equal to the change in tilt when moving from position $\theta_1$ to $\theta_2$), needs a substantially smaller change in voltage from $v_{p5}$ to $v_{p6}$. The smallest change in the received analog position voltage needed by the MEMS actuator 206 is equal to $v_{p6}-v_{p5}=v_a$.

In some implementations, the position of MEMS mirror 208 can be controlled by two opposing MEMS actuators simultaneously. For example, the MEMS mirror 208 may be driven in a positive angular direction by a positive MEMS actuator and driven in a negative angular direction by a negative MEMS actuator. The actual angular displacement of the MEMS mirror 208 can be a result of the net displacement provided by the combination of the drives of the two MEMS actuators. In some implementations, the two MEMS actuators can have similar transfer function characteristics. Each of the two MEMS actuators can operate over their respective range of analog position voltages. In some implementations, a range of analog position voltages of one of the two MEMS actuators may overlap with a range of analog position voltages of the other of the two MEMS actuators for a given range of angular displacement of the MEMS mirror 208.

In some implementations, the resolution of the DAC 204 can be, in part, a function of the smallest incremental voltage the DAC 204 can output. For a given full range of voltages output by the DAC 204, the smallest incremental voltage output by the DAC 204 provides a total number of voltage steps at the smallest increment voltage that the DAC 204 can output. In some implementations, the resolution of the DAC 204 can be expressed in terms of the number of bits that are needed by the DAC 204 to produce the desired output voltages. The number of bits, or resolution, N can be determined according to the following relationship: a total number of voltage steps=$2^N-1$.

For example, for the DAC 204 providing a full output voltage range of 15 V with the smallest incremental voltage equal to 0.5 V, the total number of voltage steps at the smallest increment of 0.5 V provided by the DAC 204 would be equal to 30. According the relationship mentioned above, to accommodate 30 voltage steps of 0.5 volts each; at least 5 bits would be needed. Thus, the DAC 204 would need to have a resolution of at least 5 bits.

In general, the resolution of the DAC 204 is selected based on the smallest increment in the analog position voltage $v_p$ that is needed by the MEMS actuator 206 to position the MEMS mirror 208 in any of the desired positions. For example, referring to FIG. 3, in which the MEMS actuator exhibits a non-linear transfer function, the resolution of the DAC 204 is selected based on the smallest increment $v_{p6}-v_{p5}=v_a$, which is relatively small, i.e. a high resolution DAC is needed. Due to the non-linear nature of the transfer function of the MEMS actuator 206, such a resolution may be unnecessarily high for positioning the MEMS mirror 208 to other positions. For example, the resolution provided to accommodate transitioning the MEMS mirror 208 between positions $\theta_5$ and $\theta_6$ may be un-necessarily high for transitioning the MEMS mirror 208 between, say, positions $\theta_1$ and $\theta_2$.

In some implementations, the cost of the DAC 204 increases considerably with the increase in the desired resolution of the DAC 204. The non-linear nature of the transfer function of the MEMS actuator 206 imposes resolution requirements on the DAC 204 that may go underutilized for the overall operation of the MEMS mirror 208.

Figure 4:
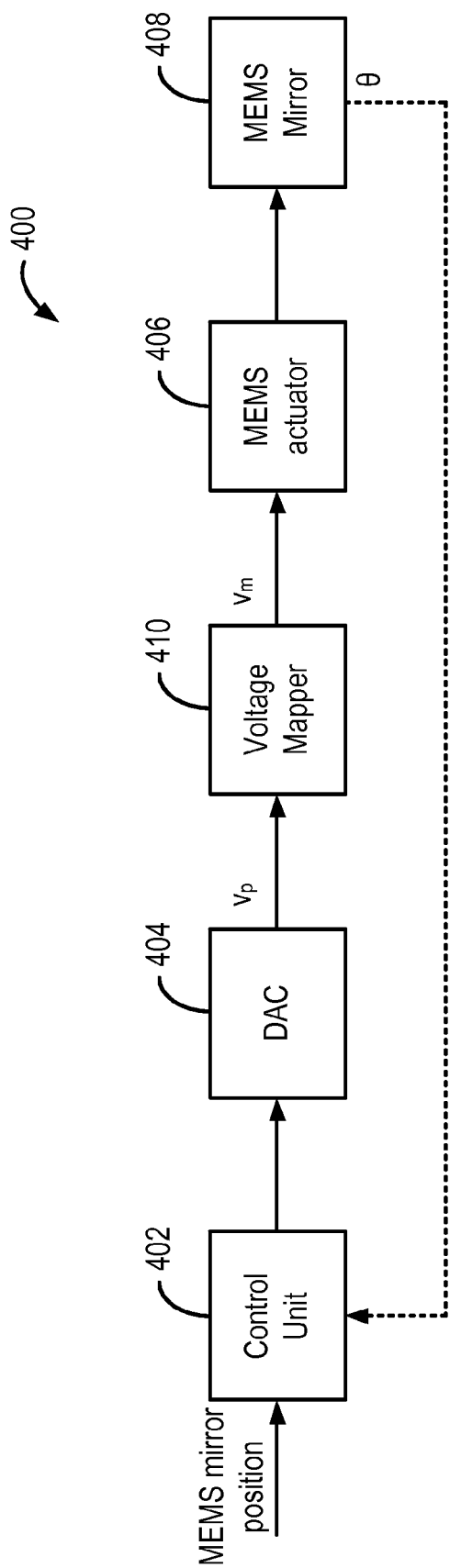
FIG. 4 shows another example MEMS mirror position control system including a voltage mapper.

FIG. 4 shows another MEMS mirror position control system 400 ("the position control system 400") including a voltage mapper (also referred to as "a non-linearity compensation circuit") 410. The position control system 400 also includes a control unit 402, a MEMS actuator 406 and a MEMS mirror 408, which can be similar to the control unit 202, the MEMS actuator 206 and the MEMS mirror 208, respectively, discussed above in relation to the mirror position control system 200 shown in FIG. 2. Specifically, the MEMS actuator 406 can have the same transfer function as that of the MEMS actuator 206, an example of which is shown in FIG. 3.

The voltage mapper 410 receives a voltage $v_p$ output by the DAC 404 and produces an mapped voltage $v_m$, which is input as a drive signal to the MEMS actuator 406. The voltage mapper 410 transforms the voltage $v_p$ into the mapped voltage $v_m$ in accordance to a mapping function. In some implementations, the mapping function employed by the voltage mapper 410 is such that the relationship between the position $\theta$ of the MEMS mirror 408 and the analog position voltage $v_p$ output by the DAC 404 is substantially linearized.

For example, assume that the transfer function of the MEMS actuator 406 is quadratic. That is, the position $\theta$ of the MEMS mirror 408 is proportional to the square of the voltage $v_m$ provided to the input of the MEMS actuator 406. This relationship can be expressed as:

$$\theta \propto v_m^2 \quad (1)$$

The quadratic relationship between the position $\theta$ and the voltage provided to the input of the MEMS actuator 406 described in Equation (1) is similar to the quadratic transfer function shown in FIG. 3.

For a MEMS actuator 406 with such a transfer function, the voltage mapper 410 employs a voltage mapping function according to which the voltage $v_m$ is equal to the square root of the output voltage $v_p$ of the DAC 404. This relationship can be expressed as follows:

$$v_m = \sqrt{v_p} \quad (2)$$

Substituting $v_m$ in Equation (1) with that shown in Equation (2) results in:

$$\theta \propto v_p \quad (3)$$

As shown in Equation (3), the position $\theta$ has a linear relationship with the analog position voltage $v_p$ output by the DAC 404.

Figure 5:
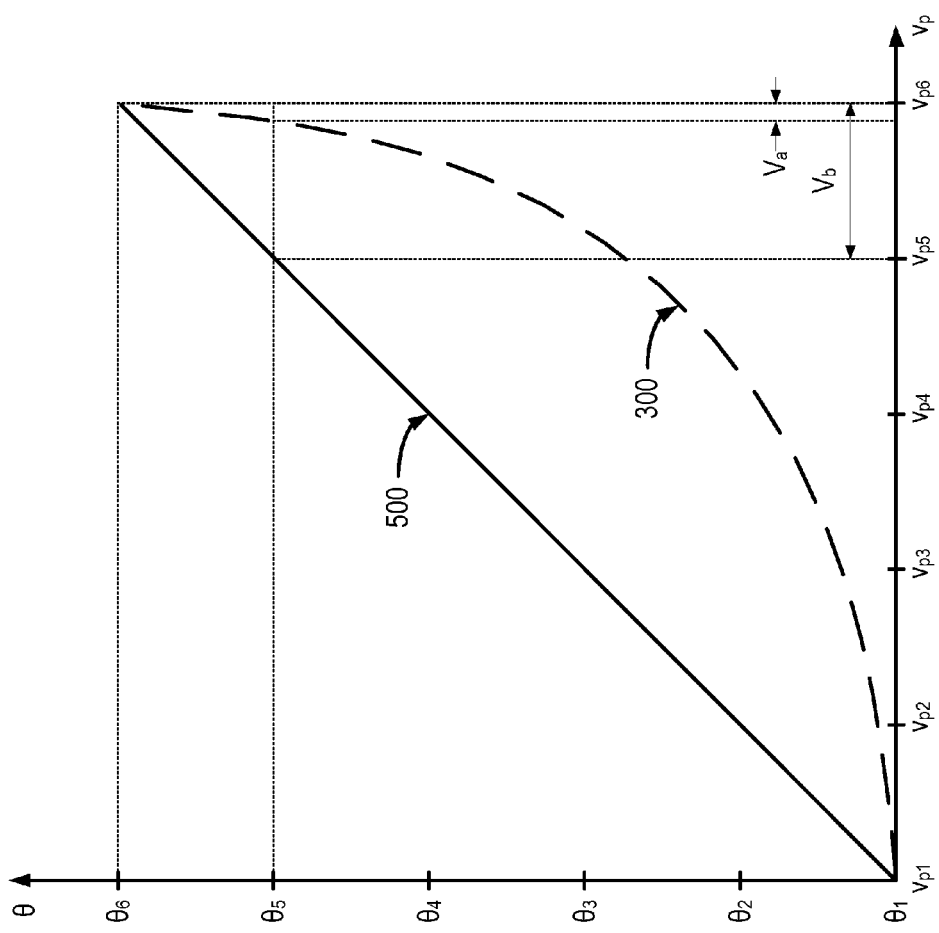
FIG. 5 shows an example relationship curve between a position of the MEMS mirror and an analog position voltage.

FIG. 5 shows a relationship curve 500 between the position $\theta$ of the MEMS mirror 408 and an analog position voltage output of the DAC 404 when the voltage mapper 410 is employed. FIG. 5 also shows, in broken lines, the non-linear transfer function 300 of the MEMS actuator 206, as shown in FIG. 3. In particular, FIG. 5 shows a substantially linear relationship between the analog position voltage $v_p$ output by the DAC 404 and the position $\theta$ of the MEMS mirror 408.

The linear relationship between the analog position voltage $v_p$ and the position $\theta$ of the MEMS mirror 408 reduces the resolution requirement of the DAC 404. Referring to FIG. 5, the smallest increment in the analog position voltage $v_p$ needed for the operation of the MEMS mirror 408 is equal to $v_b$. For comparison, the smallest incremental voltage $v_a$ corresponding to the non-linear transfer function curve 300 is also shown. As seen in FIG. 5, $v_b > v_a$. As mentioned above, the resolution needed for the DAC 404 is a function, in part, of the smallest incremental voltage that the DAC 404 needs to generate at its output. Introducing the voltage mapper 410 and linearizing the relationship between the analog position voltage output by the DAC 404 and the position $\theta$ of the MEMS mirror 408 increases the magnitude of the smallest incremental voltage that the DAC 404 needs to generate. Therefore, the DAC 404 can be designed with lower resolution, and therefore lower cost, compared to the DAC 204 discussed above in relation to FIG. 2.

The voltage transfer function of the voltage mapper 410 is not limited to the square-root transfer function discussed above, but can be based on any transfer function of the MEMS actuator 406. For example, if the transfer function of the MEMS actuator 406 were a logarithmic function, then the voltage transfer function of the voltage mapper 410 can be designed to be an anti-logarithmic function, such that the overall relationship between the analog position voltage output by the DAC 404 and the position of the MEMS mirror 408 is linear.

In some implementations, the voltage mapper 410 can be implemented using discrete circuits. For example, in some implementations, the square-root voltage transfer function of the voltage mapper 410 discussed above can be implemented using operational amplifier based circuits. In some other implementations, transistor circuits can be utilized to implement the desired voltage transfer function of the voltage mapper 410.

Figure 6:
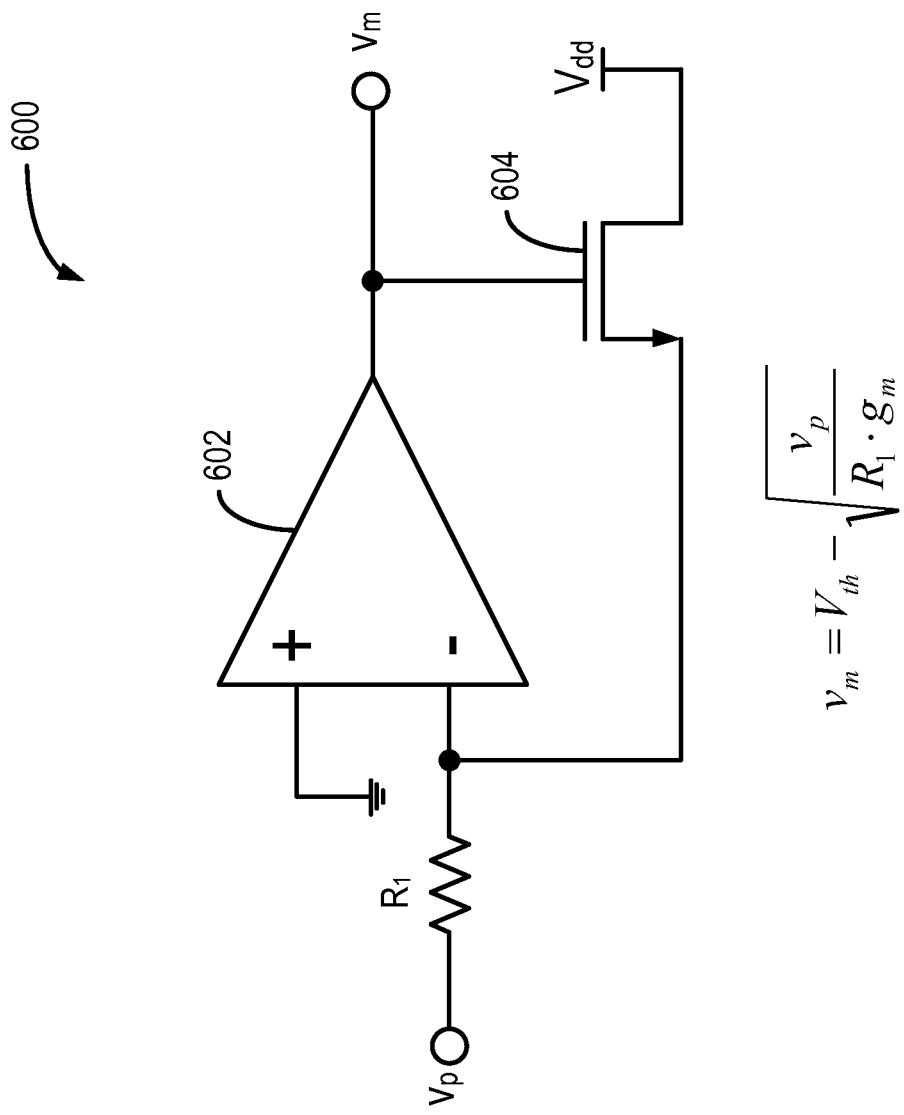
FIGS. 6-8 show various example voltage mappers to be used in the MEMS mirror position control system shown in FIG. 4.

FIG. 6 shows an example voltage mapper 600 to be used in the MEMS mirror position control system 400 shown in FIG. 4. In particular, the voltage mapper 600 has a square-root voltage transfer function. The voltage mapper 600 includes an operational amplifier ("OPAMP") 602, a resistor $R_1$, and an n-type metal-oxide semiconductor (MOS) transistor 604. The analog position voltage $v_p$, which is provided by the DAC 404, is input to the negative terminal of the OPAMP 602 via the resistor $R_1$. The output of the OPAMP 602 is fed to the gate terminal of the MOS transistor 604. One of the source/drain terminals of the MOS transistor is connected to a DC power supply $V_{dd}$, while the other of the source/drain terminal of the MOS transistor 604 is fed back to the negative input terminal of the OPAMP 602. The positive input terminal of the OPAMP 602 is connected to a ground voltage.

The MOS transistor 604 is operated in the saturation region of operation. Under the saturation region of operation, the MOS transistor exhibits a square relationship between the voltage difference between its gate and source terminals and the current flowing through the MOS transistor 604. By placing the MOS transistor 604 in the negative feedback path of the OPAMP 602, the voltage mapper utilizes the square relationship exhibited by the MOS transistor 604 to generate a mapped voltage $v_m$ that is substantially a square-root of the analog position voltage $v_p$. Specifically, the mapped voltage $v_m$ at the output of the OPAMP 602 can be given by the following Equation (4):

$$v_m = V_{th} - \sqrt{\frac{v_p}{R_1 \cdot g_m}} \quad (4)$$

where $V_{th}$ and $g_m$ are the threshold voltage and the transconductance of the MOS transistor 604. The transconductance of the MOS transistor 604 and the value of the resistor $R_1$ can be appropriately selected to achieve the desired voltage transfer function for the voltage mapper 600.

Figure 7:
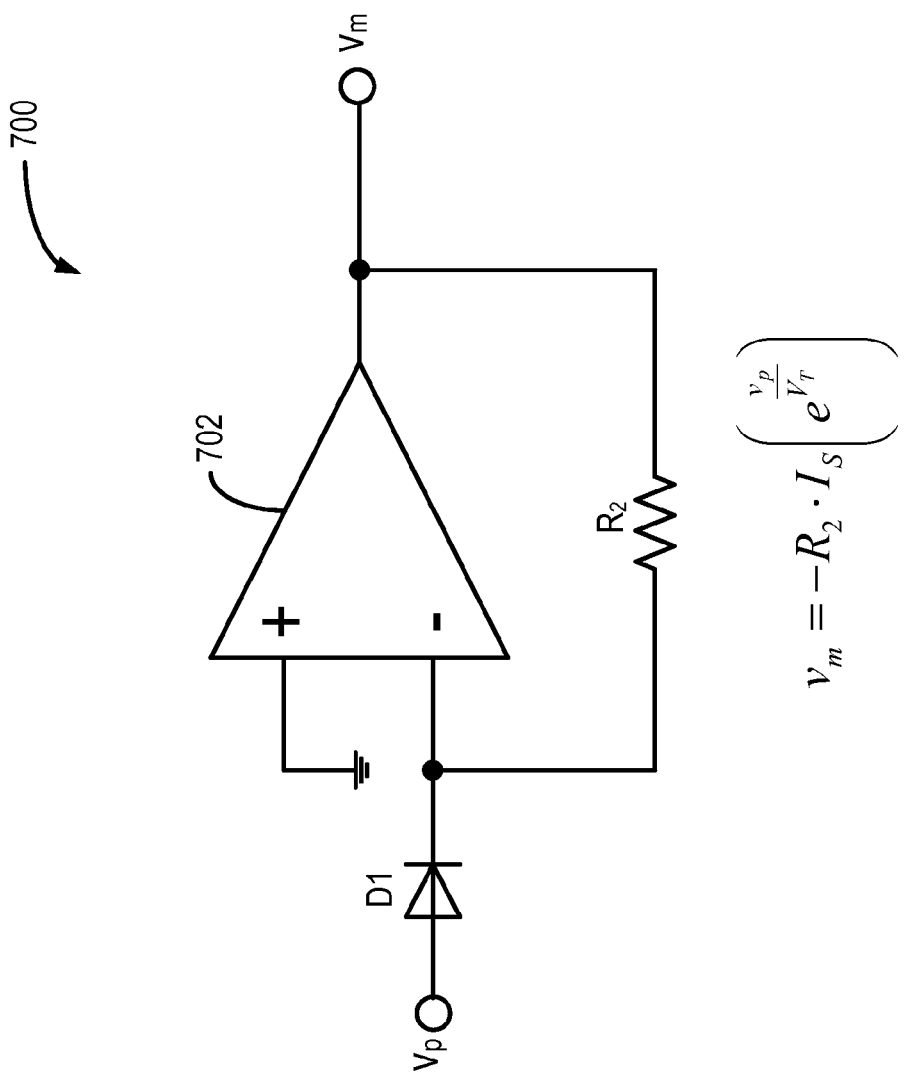

FIG. 7 shows another example voltage mapper 700 to be used in the MEMS mirror position control system 400 shown in FIG. 4. In particular, the voltage mapper 700 can be used in instances where the MEMS actuator 406 exhibits a logarithmic transfer function. The voltage mapper 700 provides an inverse logarithmic or exponential transfer function. The voltage mapper 700 includes an OPAMP 702, a diode D1, and a feedback resistor $R_2$. The analog position voltage $v_p$, which is provided by the DAC 404, is input to the negative terminal of the OPAMP 602 via the diode D1. The output of the OPAMP 702 is fed back to the negative terminal of the OPAMP 702 via the feedback resistor $R_2$. The positive input terminal of the OPAMP 702 is connected to a ground voltage. The current through the diode D1 is an exponential function of the voltage across the diode. The voltage mapper 700 utilizes this aspect of the diode D1 to provide a mapped voltage $v_m$ that is an exponential function of the analog position voltage $v_p$. Specifically, the relationship between the mapped voltage $v_m$ and the analog position voltage $v_p$ can be expressed by the following Equation (5):

$$v_m = -R_2 \cdot I_S \left( e^{\frac{v_p}{V_T}} \right) \quad (5)$$

where $I_S$ and $V_T$ are the reverse bias saturation current and the thermal voltage of the diode D1. An appropriate diode D1 with the desired values for $I_S$ and $V_T$ can be selected. In some implementations, the voltage mapper 700 can include additional circuitry for temperature compensation, polarity reversal, low-pass filtering, etc.

Figure 8:
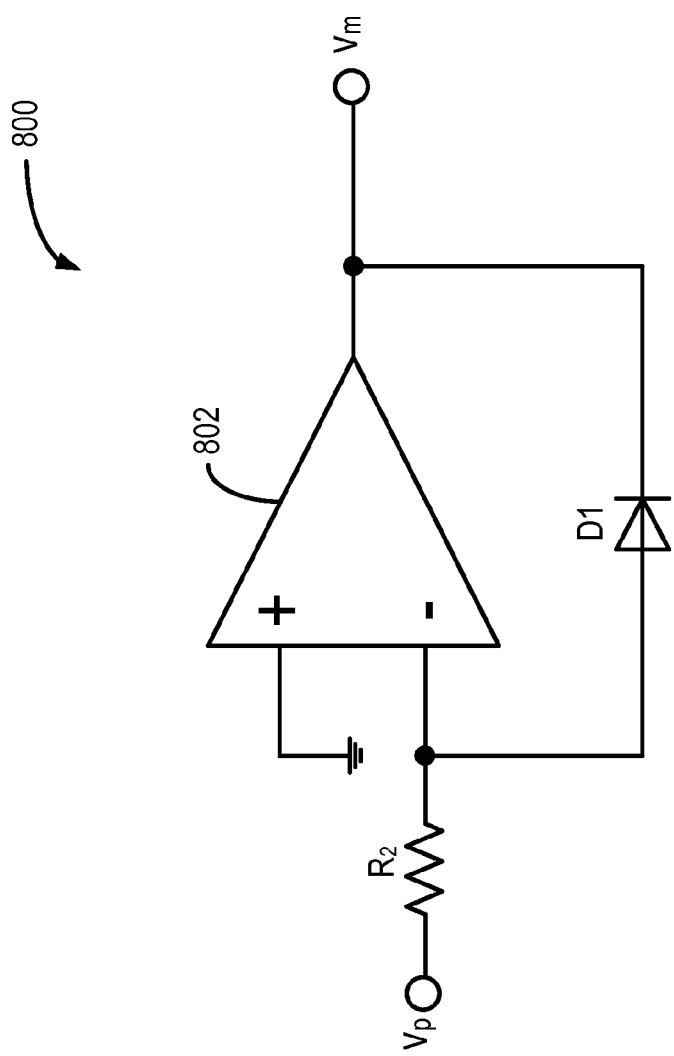

In some implementations, where the MEMS actuator 406 exhibits an exponential transfer function, a voltage mapper circuit similar to the the voltage mapper 700 shown in FIG. 7 can be utilized to provide a logarithmic relationship between the mapped voltage vm and the analog position voltage vp. For example, FIG. 8 shows yet another example voltage mapper to be used in the MEMS mirror position control system 400 shown in FIG. 4. In particular, the voltage mapper 800 includes an OPAMP circuit similar to that of the voltage mapper 700, but in which the positions of the diode D1 and the resistor R2 have been switched to provide a logarithmic transfer function. In particular, the analog position voltage vp can be fed to the negative input terminal of the OPAMP 802 via the resistor R2, and the anode and cathode of the diode D1 can be connected to the negative input terminal and the output terminal (i.e., to the mapped voltage vm), respectively, of the OPAMP 702. For small values of resistor R2 and current Is, the voltage mapper 800 can provide a logarithmic relationship between the mapped voltage vm and the analog position voltage vp.

Generally, OPAMP circuits can be used to provide several other transfer functions for the voltage mapper 410. In some implementations, if an electronic component or collection of components having a non-linear transfer function that is similar to the non-linear transfer function of the MEMS actuator 406 is placed in the negative feedback path of the OPAMP, then the overall circuit can provide the desired relationship between the analog position voltage vp and the mapped voltage vm that is a inverse of the non-linear transfer function of the MEMS actuator 406. As a result, a linear relationship would be established between the analog position voltage vp and the position θ of the MEMS mirror 408.

In some implementations, the voltage mapper 410 can include signal conditioning circuitry, such as low-pass filters, to smoothen the mapped voltage $v_m$ before being provided to the MEMS actuator 406. In some implementations, other signal conditioning circuits such as level shifters, peak-limiters, etc., can also be employed.

In some implementations, despite the inclusion of the voltage mapper 410, some non-linearity may still remain between the analog position voltage and the position of the MEMS mirror 408. In some such implementations, the non-linearity could be addressed by the control unit 402. Specifically, the control unit 402 can modify the values of the digital position codes and providing the modified values of the digital position codes to the DAC 404. The modifications made to the digital position codes can be such that a linear relationship between the analog position voltage and the position of the MEMS mirror 408 is maintained. In some implementations, the control unit 402 can utilize a look-up-table (LUT) for determining the modifications to be made to the digital position codes. The LUT can include a list of digital position codes and corresponding values of the modified digital position codes. The control unit can look-up the value of the digital position code in the LUT and obtain the corresponding value of the modified digital position code.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A micro-electromechanical systems (MEMS) based optical switch, comprising:
   a plurality of optical input ports providing incoming optical signals;
   a plurality of optical output ports providing outgoing optical signals;
   a plurality of MEMS light redirectors (LRs) for selectively redirecting the incoming optical signals to the plurality of optical output ports;
   a MEMS actuator for providing a MEMS LR position to at least one of the plurality of MEMS LRs in response to a drive signal, the MEMS actuator having a non-linear drive signal to MEMS LR position transfer function; and
   a driver circuit communicably coupled to the MEMS actuator, including:
   a digital-to-analog converter (DAC) for generating an analog MEMS position signal in response to a digital MEMS position value; and
   a non-linearity compensation circuit having an input coupled to an output of the DAC to receive the analog MEMS position signal, and an output coupled to the MEMS actuator for providing the drive signal to the MEMS actuator, the non-linearity compensation circuit implementing a transfer function that substantially counters the non-linearity of the drive signal to MEMS LR position transfer function such that the MEMS actuator exhibits a substantially linear response to the output of the DAC.

2. The MEMS based optical switch of claim 1, wherein the non-linearity compensation circuit includes an operational-amplifier circuit for transforming the analog MEMS LR position signal into the drive signal.

3. The MEMS based optical switch of claim 1, wherein the non-linear drive signal to MEMS LR position transfer function is logarithmic, and wherein an analog MEMS position signal to the drive signal transfer function of the non-linearity compensation circuit is inverse logarithmic.

4. The MEMS based optical switch of claim 1, wherein the a drive signal to MEMS LR position transfer function is quadratic, and wherein an analog MEMS position signal to the drive signal transfer function of the non-linearity compensation circuit is inverse quadratic.

5. The MEMS based optical switch of claim 1, wherein the non-linear drive signal to the MEMS LR position transfer function is exponential, and wherein an analog MEMS position signal to the drive signal transfer function of the non-linearity compensation circuit is logarithmic.

6. A method for positioning a micro-electromechanical systems (MEMS) light redirector (LR) in an optical communication switch comprising:
  obtaining a digital MEMS LR position value;
  converting the digital MEMS LR position value into an analog MEMS LR position signal;
  transforming the analog MEMS LR position signal into a drive signal such that a MEMS LR position has a linear relationship with the analog MEMS LR position signal; and providing the drive signal to a MEMS LR actuator for positioning the MEMS LR based on the magnitude of the drive signal, wherein the MEMS LR actuator has a non-linear drive signal to MEMS LR position transfer function.

7. The method of claim 6, wherein the non-linear drive signal to MEMS LR position transfer function is logarithmic, and wherein transforming the analog MEMS LR position signal into a drive signal includes transforming the analog MEMS LR position signal into the drive signal using an inverse logarithmic transfer function.

8. The method of claim 6, wherein the non-linear drive signal to MEMS LR position transfer function is quadratic, and wherein transforming the analog MEMS LR position signal into a drive signal includes transforming the analog MEMS LR position signal into the drive signal using an inverse quadratic transfer function.

* * * * *